US008881065B2

(12) United States Patent
Nickell et al.

(10) Patent No.: US 8,881,065 B2
(45) Date of Patent: Nov. 4, 2014

(54) PRESENTATION MODE/FULL-SCREEN MODE INTERRUPTING ACTION PREVENTION

(75) Inventors: Seth Nickell, Westford, MA (US); Bryan Clark, Westford, MA (US); Bastien Nocera, Guildford (GB)

(73) Assignee: Red Hat, Inc., Raleigh, NC (US)

( * ) Notice: Subject to any disclaimer, the term of this patent is extended or adjusted under 35 U.S.C. 154(b) by 631 days.

(21) Appl. No.: 11/160,903

(22) Filed: Jul. 14, 2005

(65) Prior Publication Data

US 2007/0016867 A1 Jan. 18, 2007

(51) Int. Cl.
*G06F 3/048* (2013.01)

(52) U.S. Cl.
USPC ............ 715/867; 715/716; 715/751; 715/758

(58) Field of Classification Search
USPC .................................. 715/867, 716, 751, 758
See application file for complete search history.

(56) References Cited

U.S. PATENT DOCUMENTS

| | | | | |
|---|---|---|---|---|
| 5,859,640 A * | 1/1999 | de Judicibus | ................. | 715/710 |
| 6,023,272 A * | 2/2000 | Malamud et al. | ............. | 715/779 |
| 6,678,007 B2 * | 1/2004 | Nason et al. | .................... | 348/564 |
| 6,922,724 B1 * | 7/2005 | Freeman et al. | ............. | 709/223 |
| 6,950,875 B1 * | 9/2005 | Slaughter et al. | ............. | 709/230 |
| 7,089,508 B1 * | 8/2006 | Wright | ........................... | 715/867 |
| 7,376,911 B2 * | 5/2008 | Brown | .......................... | 715/802 |
| 7,458,082 B1 * | 11/2008 | Slaughter et al. | ............. | 719/328 |
| 7,552,177 B2 * | 6/2009 | Kessen et al. | .................. | 709/206 |
| 7,606,862 B2 * | 10/2009 | Swearingen et al. | ......... | 709/206 |
| 7,853,652 B2 * | 12/2010 | McCarty | ....................... | 709/206 |
| 7,908,325 B1 * | 3/2011 | Pabla et al. | .................... | 709/205 |
| 8,099,482 B2 * | 1/2012 | Clark et al. | ..................... | 709/223 |
| 2003/0147635 A1 * | 8/2003 | Jung et al. | ..................... | 386/125 |
| 2004/0051780 A1 | 3/2004 | Sudo | | |
| 2004/0199763 A1 * | 10/2004 | Freund | .......................... | 713/154 |
| 2005/0099432 A1 * | 5/2005 | Chavis et al. | ................. | 345/619 |
| 2005/0252963 A1 * | 11/2005 | Adams et al. | ................. | 235/382 |
| 2006/0090140 A1 * | 4/2006 | Tung | ............................. | 715/764 |
| 2006/0129947 A1 * | 6/2006 | Hamzy et al. | ................. | 715/790 |
| 2007/0011626 A1 * | 1/2007 | Castaneda | ..................... | 715/867 |

* cited by examiner

*Primary Examiner* — Anil N Kumar
(74) *Attorney, Agent, or Firm* — Lowenstein Sandler LLP (57) ABSTRACT

A method and program for preventing an interrupting action in a computer resource for a full-screen mode or presentation mode of a user application are disclosed. Such a method includes: detecting, for example by a window manager, that a user application is entering into full-screen mode in a display space of the computer resource; transmitting to a target module, for example via a message bus, a mode message indicating that the full-screen mode is being entered; and preventing the interrupting action by the target module. The interrupting action may be a display action in a display space associated with the computer resource. The target module may be an instant messaging application, a screen saver application, a calendar application, a power management application, or a voice communication application.

24 Claims, 7 Drawing Sheets

Toolbar 5-1

Full-screen icon 5-2

Fig. 5B

Full-screen icon 5-2

Full-screen status display 5-3

Fig. 5C

Full-screen icon 5-2

Full-screen status display 5-3

PRESENTATION MODE/FULL-SCREEN MODE INTERRUPTING ACTION PREVENTION

FIELD OF INVENTION

The present invention relates to computer display control and to management of interrupting actions or disruptive actions during a full-screen mode or presentation mode of a user application.

BACKGROUND OF THE INVENTION

Many types of applications make use of a presentation mode or full-screen mode to present audiovisual data or video data or the like. For example, a slide show presentation, a picture display application and a movie player application may be set to enter a presentation mode in which a full-screen or a substantial portion of a full-screen of a computer display is utilized to present audiovisual data, video data, slide show data or the like.

Various types of unanticipated information are sometimes presented to the user without the user requesting the information at the time. For example, a screensaver application may present one or more images to a display after a specified time of computer nonuse or user inaction, or a message, such as a text message, may be presented or displayed by an instant messaging application.

It is often the case that a user does not wish a full-screen mode presentation to be interrupted or disrupted by such unanticipated information or images. However, users may not recognize that such unanticipated information or images may interrupt their presentation, or a user may not be aware of all applications that may generate such interruptions. Further, the user may not wish to be burdened with preventing or disabling such interrupting actions to their full-screen presentations each time they use the full-screen mode.

SUMMARY OF THE INVENTION

A method and program for preventing an interrupting action in a computer resource for a full-screen mode of a user application are disclosed. Such a method according to the present invention includes: detecting that a full-screen mode or presentation mode is being entered or that an instruction to enter the full-screen mode has been received; transmitting to a target module a mode message, responsive to the detection; and preventing the interrupting action by the target module. In this method, the interrupting action may be a display action in a display space associated with the computer resource or an auditory action.

According to an embodiment of the present invention, a window manager may detect entry of the full-screen mode by the user application, and generate the mode message responsive to said detecting. A message bus may be utilized to transmit the mode message to the target modules. The user application may be, for example, a slide presentation application, a picture display application, a movie player application, a music player application, or a calendar application. The target module may be, for example, an instant messaging application, a screen saver application, a power management application, a voice communication application or the like.

Also, an icon or other type of indication may be displayed by the display resource to indicate a status of the full-screen mode, for example that the full-screen mode has been entered. The target module whose functions are affected by the full-screen mode may be indicated to the user, or the functions affected by the presentation mode may be indicated. Further, the mode message may be transmitted or broadcast to one or more additional target modules or to all of the target modules.

The display space may include all or substantially all of a viewing area of the display resource, perhaps excepting one or more tool bars.

The target module may be controlled to transmit a busy notification to a user communicating with a node associated with the computing environment, such that the busy notification indicates that display of communications from the user will temporarily be prevented in the display space. For example, such a communication may be part of an instant messaging application. By way of illustration, the busy notification could be a text message.

DETAILED DESCRIPTION OF THE INVENTION

The following discussion and the foregoing figures describe embodiments of Applicant's invention as best understood presently by the inventors, however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Figure 1:
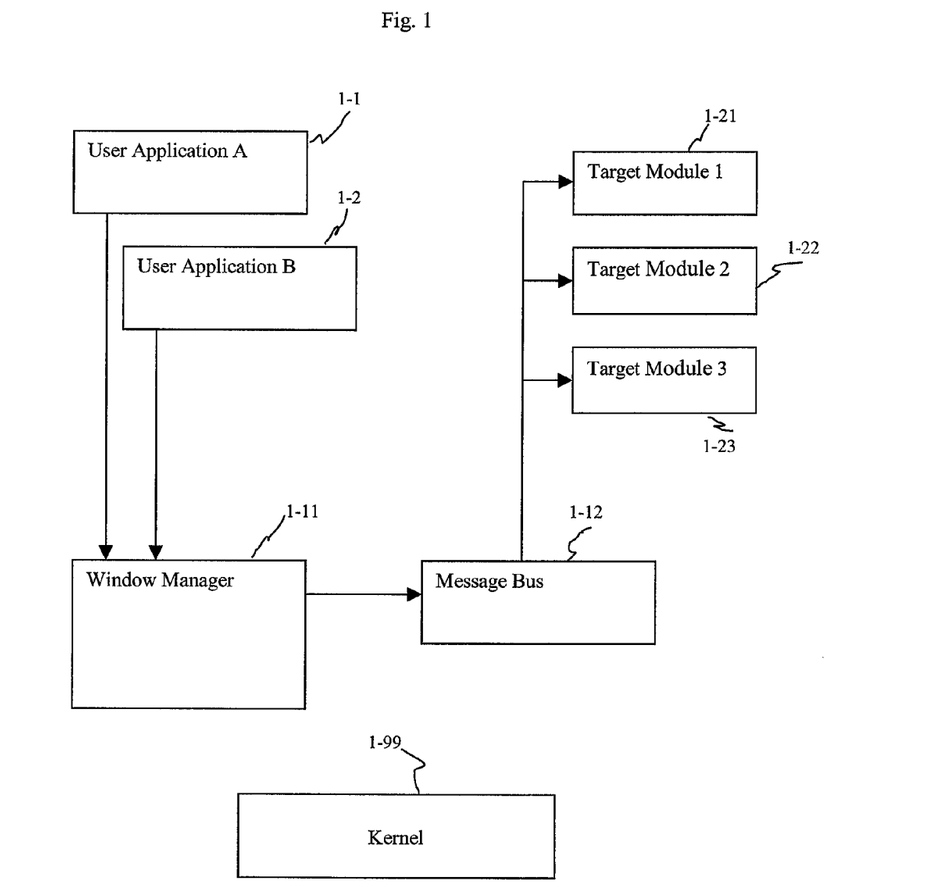
FIG. 1 is a schematic illustration of a portion of the system according to a first embodiment of the present invention.
Figure 2:
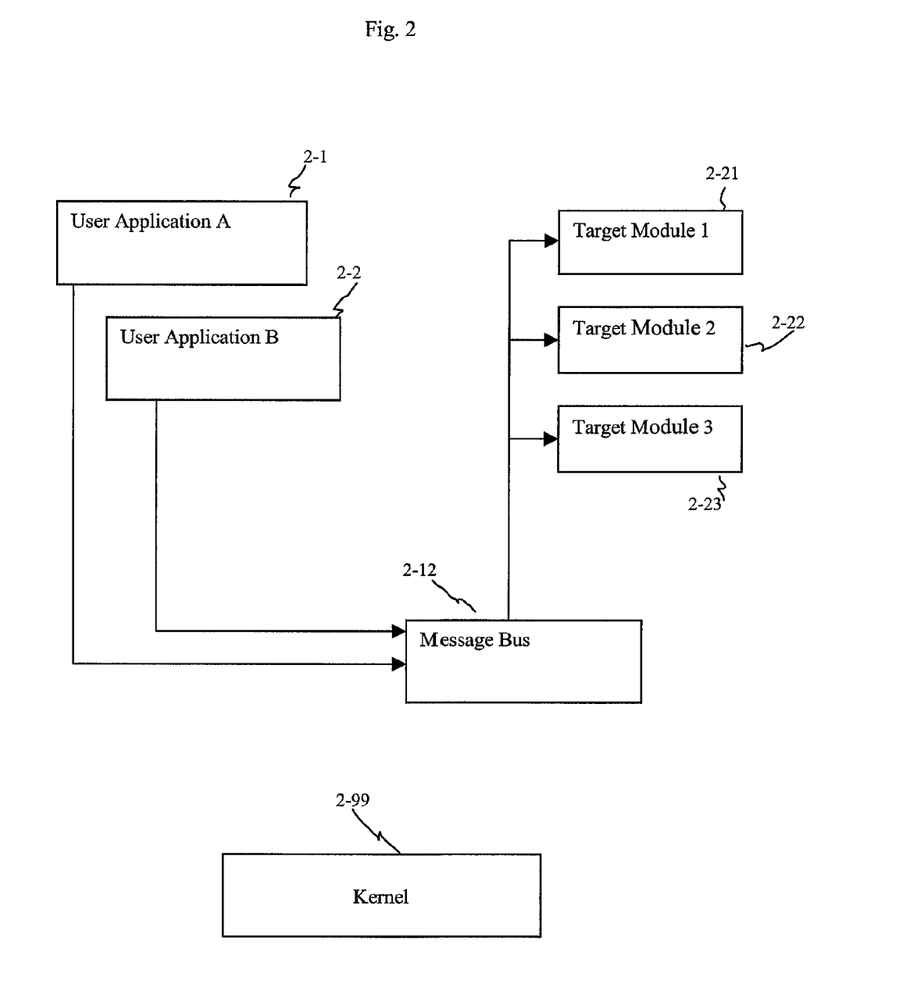
FIG. 2 is a schematic illustration of a portion of the system according to a second embodiment of the present invention.

As shown in FIGS. 1 and 2, a system performing a method according to the present invention may include several modules, which will be described below. Modules of such a system, or portions thereof, may be comprised of hardware, software, firmware, or a combination of the foregoing, however some modules may be comprised of hardware for example, while other modules may be comprised of software, firmware or a combination thereof.

FIG. 1 illustrates communication between the modules of the system according to a first embodiment of the present invention involving window manager 1-11. User application A, 1-1, is a user application, such as a slide show presentation program, that may enter a full-screen mode. For example, user application A, 1-1, may be presentation software such as OpenOffice Impress, a photograph or picture display application, such as a picture rotation or shuffle application with or without music, a video data or movie player application, a jukebox or music player application with an image presentation feature or status indicator, or any one of a number of such and similar software applications that have a state similar to a full-screen mode or presentation mode in which a substantial portion of a viewing area of a display (sometimes referred to herein as a display space) is required. Similarly, user application B, 1-2, may be an application of the same type as user application A, 1-1, or may be a different application of the types discussed above. Additional user applications may also be included.

User application A, 1-1, may enter a full-screen mode on a display space associated with the computer resource in which it is running, such as a desktop personal computer, a laptop or notebook personal computer, handheld device, a mobile communication device or the like, or on a display space logically connected to the computer resource in which it is running. Such a logical connection may include a wired or wireless connection, including a connection via a network, such as a LAN, a WAN, or the Internet.

Further, a user application may enter a full-screen or presentation mode when presenting an audio output or providing for an interaction with the user involving audio data. For example, if the user application is a music player application, such as an MP3 player, a CD or DVD player, a web audio data down-loader, a radio frequency tuner application, or the like, the user may wish not to be interrupted, and thus may wish that the music player application enter a presentation mode or full-screen mode in which interrupting actions entailing sounds, audio, visual and/or audio-visual displays are prevented. That is, in addition to, or instead of, making use of a display space in a full-screen mode, the user application may provide a "sound space" or "audio environment" as the presentation mode. In this respect, the term "presentation mode" may include a "full-screen mode" irrespective of whether the presentation is a visual presentation, an audio presentation or some combination of both. Similarly, other types of user applications that present audio information or audio outputs, such as a telephone application, including for example a voice over IP application, with or without associated visual displays or presentations, may enter a presentation or full-screen mode.

Window manager 1-11 detects that a user application, such as user application A, 1-1 or user application B, 1-2 has entered a full-screen mode. For example, user application A, 1-1, may send a message to window manager 1-11 that it is entering full-screen mode. According to an aspect of the present invention, this message may be the request or message to the window manager 1-11 that a display provided by the user application A, 1-1, be taken into full-screen presentation mode. Also, this message may be a message in addition to or modification of such request or message to the window manager 1-11.

Alternatively, window manager 1-11 may detect a user instruction to user application A, 1-1, to enter a full-screen mode. Upon such detection, window manager 1-11 generates a mode message and transmits it to one or more target modules, shown in FIG. 1 as target module 1, 1-21, target module 2, 1-22, and target module 3, 1-23. A message bus may be used to transmit the mode message to the target modules. However, the term "message bus" is to be broadly understood as any type of inter-process communication (IPC) that is able to transmit messages or signals to other modules or processes in an operating system environment. In a typical system, the window manager, the user applications and the target modules would be running in an application or operating system layer above the kernel layer 1-99.

According to an aspect of the present invention, the message bus broadcasts the mode message to all modules, including applications, services or processes that may generate an interrupting action of the full-screen mode. The target module may be a screensaver application, for example a screensaver that is set to display one or more images to a display space after an elapsed time without user input. The target module may also be a power management application that provides information about the power remaining or available to a processor associated with the display space, and may control screen blanking, a suspend mode entry, a low-battery pop-up window, or other types of power information signaling, warning or display. The target module may be an instant messaging application, for example a communication application that allows text messages to be instantly displayed. Further, the target module may be a calendar application or a date book application that allows users to set appointments and receive reminders of events at specified times or dates (hereinafter sometimes referred to as a calendar application or module). Also, the target module may be a voice communication application, such as a voice over IP telephone application.

The target module may be any type of application that could present an unanticipated action, such as an interrupting action, in a display space in which the full-screen mode is entered. Such interrupting actions may include displaying an icon, an image, a pop-up menu, bar, or display, a text notification or reminder, audio data or sound, or an alert signal, such as a "ping" or an alarm, screen blanking or blinking, entering a suspend mode, or other types of signaling, interrupting, disrupting, warning, or alerting actions. Accordingly, the target module may be an application, process or service that is running or associated with a processor housed in the same unit as the user application that generates the full-screen mode, or be in the same unit as the display space in which the full-screen mode is entered, or may be an application, process or service that is running or associated with a processor that is connected to the foregoing applications or display spaces via a wired or wireless connection. For example, in the voice over IP telephone application, the target module may be associated with a voice over IP box, such that the target module receives the mode message via wireless communication.

The display space on which the full-screen mode is entered by the user application may comprise an area on a monitor or display, such as a CRT screen, a flat screen display (e.g. LCD or plasma), a projection system, or any such display system suitable for carrying out the present invention. The display space may comprise all of the viewing area of such a display, or substantially all of the viewing area, for example one or more tool bars, icons or the like may also be displayed in addition to the display space. Alternatively, the same display may allow for several full-screen modes to be entered simultaneously on adjacent display spaces.

It will be understood that the full-screen mode may be displayed simultaneously, or virtually at the same time, in several display spaces associated with one or more processors. By way of example, such an application may be important in a videoconferencing environment. For example, the full-screen mode may be displayed on a display space of a laptop or desktop computer that is managing a presentation displayed on a projection system connected to the laptop or desktop computer, and the full-screen mode may be streamed to one or more remote locations for display at display spaces in the remote locations. In such an environment, the interrupting action control method and system according to the present invention could prevent interrupting actions on one, more than one but not all, or all of such display spaces. By way of illustration, the user running the full-screen mode presentation may wish to prevent interrupting actions in all of the display spaces except for the display space on the user's laptop screen, because such interrupting actions on the laptop screen would not be disruptive of the presentation or reveal personal information and because the user may wish to be informed when the power remaining on the user's laptop is reaching a critically low-level according to the Power Manager.

Operations of embodiments of the present invention will now be explained with reference to FIGS. 1-7.

Figure 3:
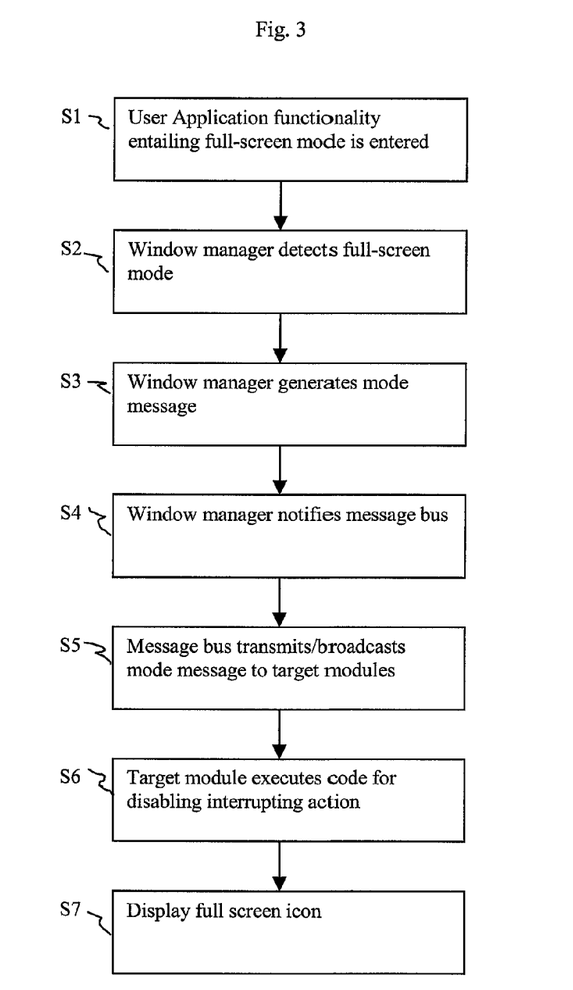
FIG. 3 is a flowchart illustrating operations performed upon entering a full-screen mode according to a first embodiment of the present invention.

An application, such as user application A, 1-1, or user application B, 1-2, enters a full-screen mode of the user application pursuant to user command or according to previously specified instruction, as shown at S1 of FIG. 3. Window manager 1-11 of FIG. 1 detects the entry of the full-screen mode by the user application, as shown at S2 of FIG. 3. For example, when the user application A, 1-1, makes an application call requesting full-screen mode, window manager 1-11 determines that a full-screen mode is being entered. According to an aspect of the present invention, user application A, 1-1, transmits a message to window manager 1-11 that it is entering full-screen mode. Alternatively, the use of the display space by the user application program can be monitored and entry of the full-screen mode determined based on the use of the display space.

Upon detection of the entry of full-screen mode, as shown at S3, window manager 1-11 generates a message or signal that is transmitted to the target modules, as shown at S4 and S5 of FIG. 3. An example of such a message generation by the window manager in high-level pseudocode is as follows:
if an application goes full-screen
   then
   message_bus.send_signal (FULLSCREEN_MODE)

It will be understood that the foregoing instruction set is provided as an example of the type of notification generation instructions that could be provided. However, many types of notification, message, signal or parameter passing, flag setting, or the like could accomplish the tasks herein contemplated.

Such a message may be a D-BUS notification transmitted by the window manager to all the target modules. The target modules may be the applications, processes, services or other modules that could generate an interrupting action while the full-screen mode persists. According to an aspect of the present invention, a D-BUS listener would handle an event such as the broadcasting of the mode message from the window manager.

It will be understood however, that a subset of the target modules may be notified depending on the application and the needs of the user and the full-screen mode. For example, the user may wish that certain target modules, such as alarms for when the power remaining approaches a critical level remain enabled. According to an aspect of the present invention, the user would be able to specify target modules that would be exempt from the full-screen mode disabling policy. Alternatively, the user would specify which target modules to include in the full-screen mode disabling policy. For example, a list of target modules and/or target module functions would be provided from which the user could select those for inclusion or exclusion.

At S5, the message bus transmits or broadcasts the mode message to the target modules. At S6, upon receipt of the mode message, each target module executes code to prevent interrupting actions. An instant messaging application could be set to an away mode, such that an automatic return message is generated and sent responsive to an incoming instant message.

For example, an instruction set similar to the following shown in high-level pseudocode is an example of instructions that could be executed by each target module. However, it will be understood that many other ways of accomplishing these notification handling and disabling functions could be designed.

Screen Saver
  if (message_bus.receive_signal (FULLSCREEN, true)
  then
  screensaver.disable( )
Instant Messaging
  if (message_bus.receive_signal (FULLSCREEN, true)
    then
    im.setAwayMessage ("I'm not interruptable")
    im.dontpopupwindows( )
Power Manager
  if (message_bus.receive_signal (FULLSCREEN, true)
    then
    power.disablescreenBlanking( )
    power.dontSuspend( )

It will be understood that other types of target modules would execute similar types of code to prevent interrupting action, such as disabling displays to the display space being utilized for the full-screen mode presentation or preventing audio alerts or alarms.

Figure 5A:
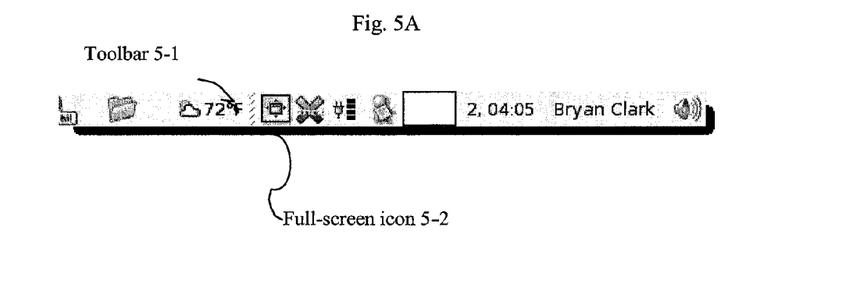
FIG. 5A-5C show a full-screen icon and its functions according to an aspect of the present invention.
Figure 5B:
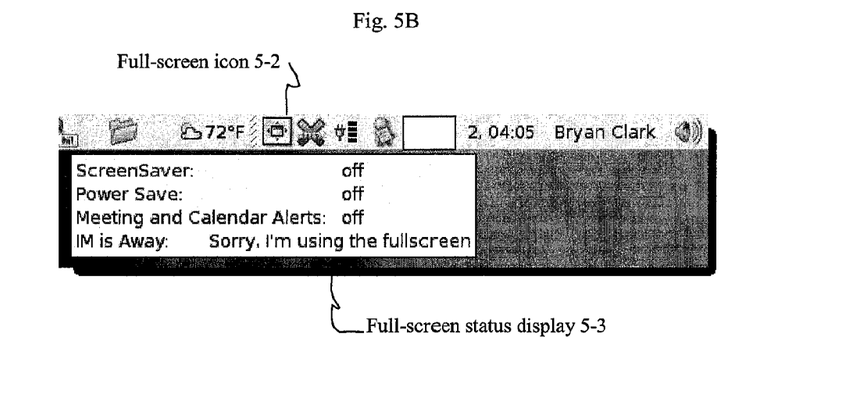
Figure 5C:
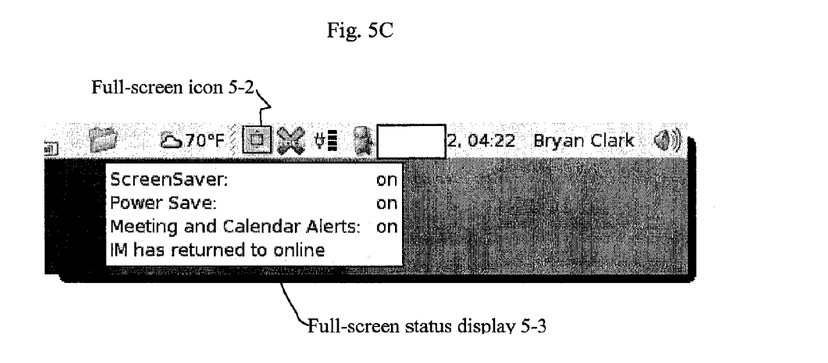

According to an aspect of the present invention, a notification to the user would be provided that a full-screen mode has been entered. For example as shown in FIG. 5A-C, an icon, 5-2, representing a full-screen mode would be displayed on a toolbar 5-1 shown in or near the display space associated with the full-screen mode. It will be understood that numerous other types of notifications to the user could be provided besides icons.

According to a further aspect of the present invention, information about the status of various target modules would be provided to the user upon request. For example, as shown in FIG. 5B, a user request, such as a mouse hover over the full-screen icon 5-2, of the toolbar 5-1, would cause of full-screen display 5-3 to be shown. As shown in FIG. 5B, during a full-screen mode, the screensaver is shown as off, the power save display is shown as off, a meeting and calendar alerts display is shown as off, and text responding to an incoming instant message is shown as "sorry, I'm using the fullscreen." Further, the functions affected by the presentation mode/full-screen mode may be indicated to the user, instead of, or in addition to an indication of the names of the target modules that are affected or disabled. Accordingly, the user may be shown the affected function by the names most familiar or the names easily identifiable by the user, rather than or in addition to displaying the names of the affected target modules. Also, where target modules have more than one function, those functions that are affected for each target module may be identified for the user. It will be understood of course that the user may request information about the status of the target modules in connection with the full-screen mode in many ways, including mouse hovering over or right clicking or single clicking of the full-screen icon 5-2, using a drop-down menu, or the like.

According to an aspect of the present invention, this full-screen icon 5-2 could persist for a while after the full-screen mode has terminated in order to allow the user to go in or out of full-screen mode without the icon appearing and reappearing at each change. For example, the icon could appear shaded for a period of time, for example ten minutes, after the full-screen mode has been exited. FIG. 5C shows the effect of a mouse hover over the shaded full-screen icon 5-2 after full-screen mode has been exited. The full-screen status display 5-3 now shows screensaver to be on, the power save display to be on, the meeting and calendar alerts display to be on, and the IM functions as having returned to online.

According to an aspect of the present invention, the icon is implemented as a separate module that is constantly running but not necessarily always displaying the icon. This module could communicate directly with the window manager 1-11 or with a display server in the case of MS Windows or other operating systems that use such a display server. Alternatively, the icon could be provided by the window manager 1-11.

An example of an operation for exiting full-screen mode according to the first embodiment of the invention utilizing the window manager will now be provided. When, as shown at S21 of FIG. 6, the user application exits the full-screen mode, the window manager 1-11 detects at S22 the end of the full-screen mode and generates an end mode message as shown at S23. Such an end mode message may be analogous to the mode message generated, except that the full-screen mode flag would be set to false.

Figure 6:
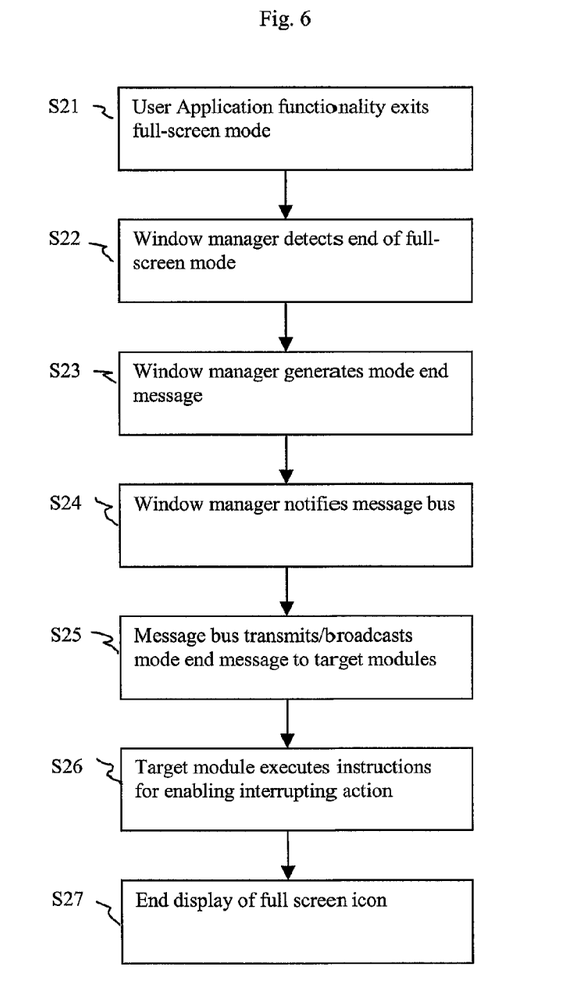
FIG. 6 is a flowchart illustrating operations performed upon exiting a full-screen mode according to the first embodiment of the present invention.

At S24, the window manager 1-11 notifies the message bus 1-12 of the mode end message, whereupon the message bus 1-12, at S25 transmits or broadcasts the mode end message to the target modules. Upon receipt of the mode end message, each of the target modules, as shown at S26, executes instructions for enabling the interrupting action, just like before the entry into the full-screen mode. Such instructions may be analogous to the instructions for preventing the interrupting action (but instead would now enable interrupting actions). The full-screen icon may then be removed, as shown at S27. As discussed however, according to an aspect of the present invention, the full-screen icon may remain for a period of time after the end of the full-screen mode.

Figure 4:
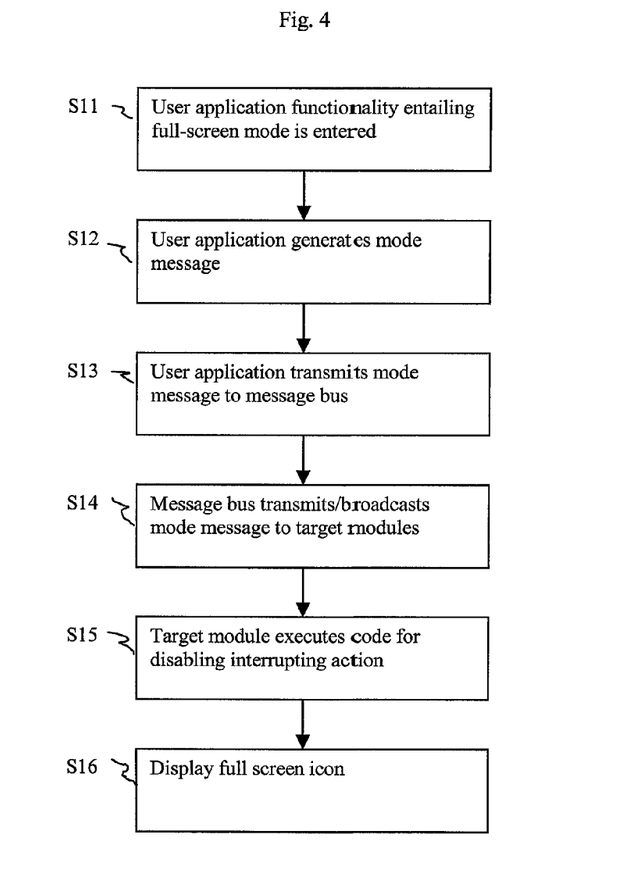
FIG. 4 is a flowchart illustrating operations performed upon entering a full-screen mode according to a second embodiment of the present invention.
Figure 7:
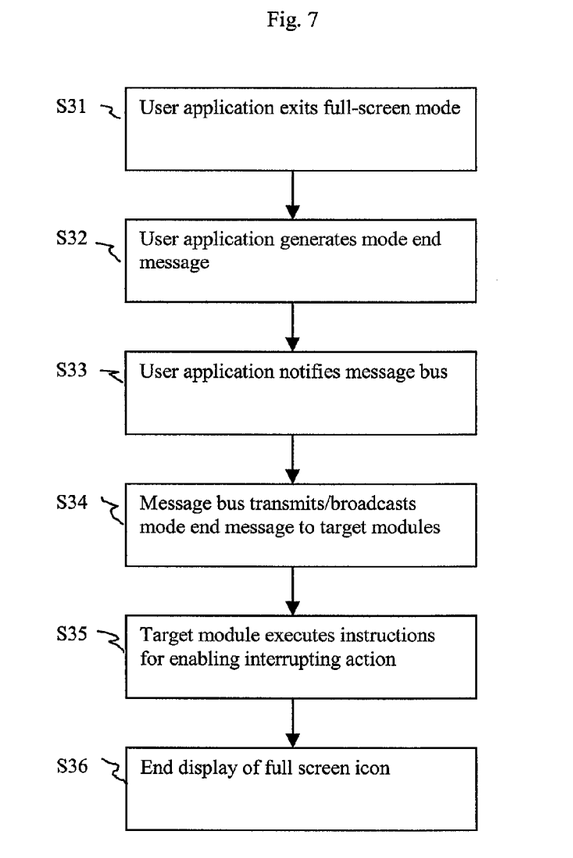
FIG. 7 is a flowchart illustrating operations performed upon exiting the full-screen mode according to the second embodiment of the present invention.

FIGS. 2, 4 and 7 describe a second embodiment of the present invention. According to the second embodiment of the present invention, a notification of the target modules that a full-screen mode is being entered is performed without utilization of a window manager 1-11. This second embodiment would advantageously enable the utilization of the method according to the present invention by an operating system that does not ordinarily include a window manager 1-11.

As shown in FIGS. 2 and 4 illustrate an operation for entering the full-screen mode according to the second embodiment. The mode message is generated by the user application, for example, upon detection by a module of the user application A, 2-1, that user application A, 2-1, is entering full-screen mode, and the mode message is transmitted to the target modules, including target module 1, 2-21, target module 2, 2-22, and target module 3, 2-23, directly via the message bus 2-12.

Accordingly, as shown in FIG. 4, when at S11 a user application enters the full-screen mode there is no need for detection by a window manager. Instead, at S12 the user application generates a mode message and, at S13, the user application notifies the message bus 2-12. At S14, the message bus transmits the mode message to the target modules, as discussed in the foregoing embodiment. At S15, the target module prevents interrupting action, for example by executing a set of instructions as discussed above.

FIG. 7 illustrates an example of an operation for exiting the full-screen mode according to the second embodiment. When, at S31 of FIG. 7, the user application exits full-screen mode, the user application generates, at S32, a mode end message that is transmitted to a message bus at S33. The message bus transmits or broadcasts the mode end message to the target modules at S34, and upon receipt of the mode end message, at S35 each of the target modules executes a set of instructions to enable again the interrupting actions, which had been disabled for the duration of the full-screen mode. At S36, the full-screen icon is removed, however as discussed the full-screen icon may be displayed for an additional period, or displayed in an altered format, for example a shaded icon may be displayed. In other respects, the second embodiment is similar to the first embodiment in which a window manger is utilized to generate and send the message mode and the mode end messages.

The present invention has been described herein with reference to particular exemplary embodiments. These exemplary embodiments are meant to be illustrative, not limiting of the scope of the invention.

What is claimed is:

1. A method, comprising:
    detecting, using a processor, entry into a full-screen mode of a user application, wherein the user application is to be displayed in a plurality of display spaces over a network, wherein a display space comprises a substantial portion of the viewing area of a display or all of the viewing area of the display;
    identifying, by the processor, an additional application over the network, the additional application to generate an action that interrupts the full-screen mode of the user application in the plurality of display spaces, wherein the action that interrupts the full-screen mode of the user application comprises a display action in a display space;
    generating, by the processor, a message comprising instructions tailored to the additional application to cause the application to disable the action that interrupts the full-screen mode of the user application in all of the plurality of display spaces except for a display space selected to be viewed by the user, wherein the disabling prevents the action from occurring for at least a duration of the full-screen mode of the user application;
    transmitting, by the processor over the network, the message to the additional application to cause the additional application to disable the action in all of the plurality of display spaces except for the display space selected to be viewed by the user; and
    when the full-screen mode ends, transmitting an end message to the additional application, the end message comprising instructions tailored to the additional application to cause the additional application to enable the action that was disabled.

2. The method of claim 1, wherein the action that interrupts the full-screen mode of the user application comprises an outputting of an audio signal by an audio output device.

3. The method of claim 1, wherein transmitting the message to the additional application comprises transmitting a mode message indicating that the user application is entering the full-screen mode.

4. The method of claim 1, wherein said detecting the entry into the full-screen mode of a user application is performed by a window manager, and, responsive to said detecting, the window manager transmits the message to the additional application.

5. The method of claim 1, wherein a window manager transmits the message to the additional application.

6. The method of claim 1, wherein said detecting the entry into the full-screen mode of a user application, and, responsive to said detecting, the user application transmits the message to the additional application.

7. The method of claim 1, wherein the user application transmits the message to the additional application.

8. The method of claim 1, wherein the message is transmitted via a message bus.

9. The method of claim 1, wherein the user application is at least one of a slide presentation application, a picture display application, a movie player application, a calendar application, or a music player application.

10. The method of claim 1, wherein the additional application comprises at least one of an instant messaging application, a screen saver application, a power management application, or a voice communication application.

11. The method of claim 1, further comprising displaying an icon indicating that the full-screen mode has been entered.

12. The method of claim 1, further comprising providing an indication of the additional application whose functions are affected by the full-screen mode.

13. The method of claim 1, further comprising notifying a user that display of communications from the user will temporarily be prevented.

14. The method of claim 1, further comprising: receiving a message from the additional application that at least one interrupting action has occurred.

15. The method of claim 1, further comprising providing an indication of functions affected by the full-screen mode.

16. A non-transitory computer readable storage medium incorporating a program of instructions that, when executed by a processor, cause the processor to perform operations comprising:
    detecting, using the processor, entry into a full-screen mode of a user application, wherein the user application is to be displayed in a plurality of display spaces over a network, wherein a display space comprises a substantial portion of the viewing area of a display or all of the viewing area of the display;
    identifying, by the processor, an additional application over the network, the additional application to generate an action that interrupts the full-screen mode of the user application in the plurality of display spaces, wherein the action that interrupts the full-screen mode of the user application comprises a display action in a display space;
    generating, by the processor, a message comprising instructions tailored to the additional application to cause the application to disable the action that interrupts the full-screen mode of the user application in all of the plurality of display spaces except for a display space selected to be viewed by the user, wherein the disabling prevents the action from occurring for at least a duration of the full-screen mode of the user application;
    transmitting, by the processor over the network, the message to the additional application to cause the additional application to disable the action in all of the plurality of display spaces except for the display space selected to be viewed by the user; and
    when the full-screen mode ends, transmitting an end message to the additional application, the end message comprising instructions tailored to the additional application to cause the additional application to enable the action that was disabled.

17. The non-transitory computer readable storage medium of claim 16, wherein the action that interrupts the full-screen mode of the user application comprises an outputting of an audio signal by an audio output device.

18. The non-transitory computer readable storage medium of claim 16, wherein transmitting the message to the additional application comprises transmitting a mode message indicating that the user application is entering the full-screen mode.

19. The non-transitory computer readable medium of claim 16, wherein said detecting the entry into the full-screen mode of a user application is performed by a window manager, and, responsive to said detecting, the window manager transmits the message to the additional application.

20. The non-transitory computer readable storage medium of claim 16, wherein a window manager transmits the message to the additional application.

21. The non-transitory computer readable storage medium of claim 16, wherein said detecting the entry into the full-screen mode of a user application is performed by the user application, and, responsive to said detecting, the user application transmits the message to the additional application.

22. The non-transitory computer readable storage medium of claim 16, wherein the user application transmits the message to the additional application.

23. The non-transitory computer readable storage medium of claim 16, wherein the message is transmitted via a message bus.

24. The method of claim 1, further comprising: receiving a selection of the additional application to which to transmit the message.

* * * * *